United States Patent

[11] 3,545,515

[72] Inventor: Georg Gottauf, Munich, Germany
[21] Appl. No.: 736,616
[22] Filed: June 13, 1968
[45] Patented: Dec. 8, 1970
[73] Assignee: Stahlgruber Otto Gruber & Company, Munich, Germany
[32] Priority: June 15, 1967
[33] Germany
[31] No. S-27011

[54] SPIKE FOR MOTOR VEHICLE TIRES
11 Claims, 5 Drawing Figs.

[52] U.S. Cl. .................................................. 152/210
[51] Int. Cl. .................................................. B60c 11/16
[50] Field of Search .................................... 152/210

[56] References Cited
UNITED STATES PATENTS
2,982,325  5/1961  Pellaton ........................ 152/210
3,404,718  10/1968  Smith ........................... 152/210

Primary Examiner—Arthur L. La Point
Attorney—Connolly and Hutz

ABSTRACT: Spikes for motor vehicle tires, such as snow tires, are in the form of hard metal pins concentrically held by inwardly projecting ribs, reinforcing seams, or the like in synthetic casings.

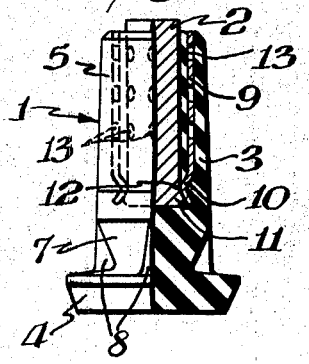
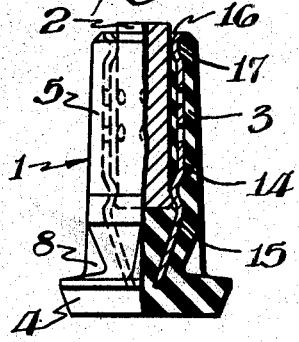
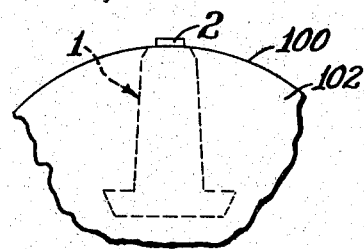
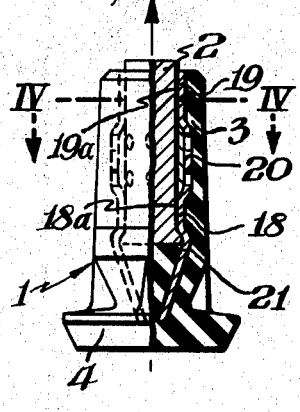
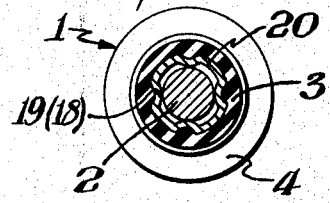

SPIKE FOR MOTOR VEHICLE TIRES

BACKGROUND OF INVENTION

The invention relates to a gripping pin for motor vehicle tires, in practice called a "spike." Such spikes are pressed into holes distributed over the circumference of the tread of snow tires, in order to give the tires greater traction on ice and packed snow thus increasing the safety of motor vehicles equipped with such tires. The spikes consist generally of a hard metal pin protruding into the road surface. A holder or jacket whose foot is a widened plate or is disklike firmly and securely anchors each spike in the tire. The hard metal pin is fitted into the holder or jacket in such a manner that it projects past its frontal surface by a margin to be effective in gripping. In this connection, in the spike fitted or "shot" into the tire tread, the frontal surface of the casing to the extent possible should terminate flush with the tread surface, while the tip of the hard metal pin protrudes past this surface by 1 to 2 mm.

The development of snow tire spikes took a course form holders of aluminum, brass, bronze, and special steel to the presently most often used lead steel special alloy. The use of aluminum was discontinued since, during driving, the hard metal pin first positioned itself at an angle in the relatively soft holder, and was then further inclined by the forces exerted on a larger surface, whereby finally the entire spike itself worked its way out of the tire tread. Even the somewhat greater stability of brass and bronze could not solve the problem. Alloy steel was later employed because it exhibits the required stability. Alloy steel, however, leads to a disadvantageous spark formation and noise trouble, particularly in driving on ice- and snow-free streets. The main disadvantages, however, found in all metal holders and particularly in those consisting of steel is the severe heating which is transmitted directly to the tire rubber in the area of the spike and which thereby leads to regeneration actions. A further disadvantage is the heavy weight of such spikes. It has therefore been attempted to abandon hard metal pins in favor of ceramic or porcelain spikes in order to utilize the hardness of this material, but this experiment had no success, since limited by the material, ceramic and porcelain spikes cannot be so shaped as to allow a secure and firm anchoring in the tire tread.

It has also been attempted to make the casing for the spikes not of metal as is generally customary but of a synthetic material much closer related chemically and physically to the tire rubber than metal, so to speak akin to it, which in comparison to metal indeed has the disadvantage of the lower stability. Such material has a line of advantages, however, among others the low heat conductivity considered to be essential, and therefore the advantage of not conducting the heat resulting in the driven tire in the hard metal pin, in a damaging manner to the rubber in the area of the spike. By a suitable selection of the synthetic material mixture and a glass fiber admixture, the heat conductivity can be further decreased and the stability increased, although not at the same rate. A further advantage is the almost complete avoidance of a noise problem, particularly in driving over ice- and snow-free streets, and furthermore the lightweight, something which is specifically dealt with below.

In a motor vehicle tire the nonelastic mass should be as slight as possible. In this regard the spike with a synthetic material casing is advantageous compared to entirely metal spikes because the nonelastic mass is decreased by more than 50 percent. This is a very important advantage, since if one pictures a single PKW tire equipped with about 100 spikes, one would realize that in each tire an imbalance occurs which even by balancing the wheel cannot be entirely eliminated, and it would be taken into consideration that this imbalance constantly changes because of the unavoidable unequal wear. Additionally, as a result of the preferred asymmetric arrangement of the spikes in relation to the median plane through the tire eccentricities set in which are inaccessible to the balance of weight on the tire rim.

Despite these considerable advantages, however, previously spikes with synthetic material casings could not be carried through, since despite choosing special synthetic material mixtures and despite the glass fiber reinforcement, a sufficient stability could not be provided with certainty and particularly not because the firm anchoring of the hard metal pin in the casing was not always guaranteed. It occurred that the hard metal pins in the casing slackened, became loose, and sometimes even eventually fell out, or that the synthetic material, particularly at the frontal surface and in the proximity of the hard metal pins, was forced out upon considerable bending strain effects in driving, or was melted away by the hard metal pin becoming very hot in driving on ice- and snow-free streets. An alternative was attempted by means of a design where a hard metal pin was inserted into an aluminum holder and this was again encased with a synthetic material coating (German design Pat. No. 1,922,385). This solution, however, can eliminate neither the disadvantages of the spikes with pure metal holders nor those with synthetic material casing. For example, the aluminum casing contributes as a massive metal part to the heating of the spike and is a very good conductor which transmits the heat derived from the hard metal pin to the thin synthetic material casing. This thin synthetic material casing is not in a position to prevent the further transmission of heat to the surrounding rubber. A further disadvantage results from the high production costs, since first a so-called "-normal" spike must be prepared consisting of the hard metal pin and its aluminum casing, the conical hard metal pin being driven or pressed into the casing. The aluminum casing must be prepared in extrusion molding process. The synthetic material casing then cost-wise comes up to the costs of the spikes of the previous type. Of course there remains the disadvantage of the insufficient stability of the aluminum used as the casing with the already described result of the tilting of the hard metal pin in its casing and with the possibility of the working its way loose of the entire spike from the tire.

SUMMARY OF INVENTION

The invention relates to a spike with synthetic material casing, which by maintaining the prescribed advantages avoids the above mentioned disadvantages, in that generally speaking the synthetic material is strengthened and hardened at the smallest possible weight increase, and the hard metal pin is centered in the casing by means of the hardening.

Accordingly, the invention relates to a spike for motor vehicle tires, consisting of a hard metal pin concentrically held in a synthetic material casing with anchoring foot, which is characterized in that a reinforcing jacket surrounding at a distance the hard metal pin is worked into the casing which centers the hard metal pin in the jacket by means of projections with ribs, reinforcing seams, side bars and the like directed inwards.

In a suitable embodiment, the reinforcing jacket is provided with holes, slots, and similar perforations.

The novel reinforcing jacket serves for the correct fixing of the hard metal pin both in the height as well as with respect to the exact centering. At the same time it forms in the synthetic material a hardening framework which on its part again directly encases the hard metal pin at the few supporting points outside the jacket. In this manner a very good heat insulation is achieved which for example is so good that the spike can be ground off by hand on a grinding wheel which of course would not be possible with a pure hard metal spike. The supporting and hardening effect of the novel jacket is for example shown in that a spike encased only with synthetic material can be broken up with a hammer, which cannot be achieved with the spike according to the invention. A further considerable advantage achievable by means of the invention is that for the synthetic material used for the casing the glass fiber portion can be increased. The heat stability of the synthetic material is dependent on the amount of the glass fiber additive. However, while the heat stability with increasing glass fiber portion becomes considerably greater, at the same time the stability decreases sharply. By the insertion of a reinforcing jacket, which extensively takes care of the maintenance of the required mechanical stability, the possibility occurs of raising the glass fiber content for the increase in thermal stability.

THE DRAWINGS

FIGS. 1—3 illustrate, partially in section, several embodiments of the novel spike on a magnified scale;

FIG. 4 illustrates a section view along the line IV–IV of FIG. 3; and

FIG. 5 is a side view of a portion of a vehicle tire incorporating the novel spike of FIGS. 1—4.

DETAILED DESCRIPTION

In FIG. 1 a spike is designated generally with 1, which consists of a hard metal pin 2 and a synthetic casing 3 having an anchoring disc 4. In order to guarantee a firm seating of the spike in the tread 100 of the tire 102, (FIG. 5) stem 5 of the spike is drawn in at the transition to the anchoring disc 4, or in other words the stem is constructed of two superimposed frustocone sections seated base to base in such a manner that above the anchoring disc 4 there results a back taper into which the rubber surrounding the spike can squeeze in driving into the tread of the motor vehicle tire. In this conical transition area 7 of stem 5, hardening ribs 8 are arranged to the anchoring plate 4, which on the one hand reinforce the cross section of the spike weakened at this point and on the other hand leave room for the insertion of the rubber of the tread surrounding the spike and holding it by radial inward directed pressing. Ribs 8 support and reinforce therefore the anchoring plate so that it cannot tilt or become positioned at a slant to the stem.

According to the invention a frame in the shape of a jacket 9 is pulled into the synthetic material casing 3 which surrounds at a distance hard metal pin 2 and also is situated at a distance from the outer surface of stem 5. By this frame the synthetic material cross section receives a reinforcement with the result that the stability of the casing is increased and the firm positioning of the hard metal pin in the casing is improved.

The reinforcing jacket 9 is furthermore provided with inward directed reinforcing seams, grooves or indentations 10, which center the hard metal pin in the casing and also fix it with respect to its proper height. The centering also simplifies the production of the spike by an injection molding machine. At the same time the centering prevents the falling out of the hard metal pin 2 from the casing 3 in that a thickening or enlarged foot or heading 11 of the end opposite the outer end of the hard metal pin leans against the inward projecting part 12 of the corrugation or like indentation 10, in case a loosening of the hard metal pin should still take place in the casing. Such a loosening however, is entirely or at least considerably avoided by using the invention in that the jacket 9 acting as the reinforcing frame holds together and reinforces the synthetic material especially in the area of the hard metal pin.

The reinforcing jacket 9, which in practice is about between 0.2 and 0.5 mm. thick, in a suitable embodiment is equipped with perforations or apertures in the form of holes and/or slots 13 through which the synthetic material penetrates spraying around hard metal pin 2 for the formation of the casing, and thus anchors the jacket in its turn in the casing. The hard metal pin is therefore surrounded in this embodiment not by two synthetic material coats separated by a reinforcing jacket but instead by one single homogeneous synthetic material coat in which the jacket is imbedded. Thus, a solid substance is provided whose stability if increased by the reinforcing jacket, whose coat or holder in extreme heat and mechanical stress is supported by a carrying member and whose weight despite this is increased unnoticeably (e.g., 1.8 gr. in comparison to 3.8 gr. in pure metal spikes) as compared to a nonreinforced synthetic material casing.

The embodiment according to FIG. 2 differs from that according to FIG. 1 in that the reinforcing jacket 14 is conically shaped, drawn over the hard metal pin 2 outwards in the direction to the anchoring plate or foot 4 and in this area 15 following about the incline of the transition area 7 between stem 5 and plate 4. Thereby even in this area the synthetic material casing is reinforced and hardened. Furthermore, jacket 14 has at the height of the upper frontal surface 16 of the synthetic material casing further inward-directed projections 17, so that in the embodiment according to FIG. 2 the hard metal pin 2 is supported at top and bottom and is thus centered.

In the embodiment according to FIGS. 3 and 4, which resembles that of FIG. 2, the inward-directed projections 18 and 19 centering the hard metal pin 2 in the synthetic material casing 3 and holding against movement in the direction of the arrow are so constructed that they touch the hard metal pin not as in the embodiment according to FIGS. 1 and 2 only pointlike but instead with a larger surface 19a or 18a in order in this manner to increase the friction contact between the outer surface of pin 2 and the inner surface of jacket 20 and to anchor in the synthetic material casing 3 over the projection 21 reaching up to the root of the anchoring plate 4.

Of course the reinforcing jackets centering and holding the hard metal pin in the synthetic material casing instead of with inward-directed projections in the form of corrugations, grooves or like indentations can also be equipped with punched lugs or side bars connected along a bending edge with the jacket. If corrugations, grooves and like indentations are provided, they can proceed annularly about the entire circumference of the jacket or at a distance from each other can be arranged on one or several horizontal planes displaced over each other or opposite each other.

I claim:

1. A spike for motor vehicle tires comprising a casing made of a synthetic material, an anchoring foot at the base of said casing, a reinforcing jacket embedded in said casing, a hard metal pin in said jacket, and inwardly directed positioning means in said jacket centering said pin in said casing.

2. A spike as set forth in claim 1 wherein apertures are in said jacket.

3. A spike as set forth in claim 1 wherein said pin has an enlarged foot, and said positioning means including projections disposed above said foot.

4. A spike as set forth in claim 3 wherein apertures are in said jacket, said positioning means including further projections directed inwardly toward the portion of said casing remote from said anchoring foot.

5. A spike as set forth in claim 4 wherein said jacket extends into said anchoring foot.

6. A spike as set forth in claim 4 wherein said casing is in the form of a pair of frustoconical sections joined at their widened ends to provide an inwardly tapered transition section adjacent said anchoring foot, reinforcing ribs further joining said anchoring foot to said transition section, and said jacket having an inwardly inclined portion at said transition section.

7. A spike as set forth in claim 1 wherein said positioning means includes projections directed inwardly toward the portion of said casing remote from said anchoring foot.

8. A spike as set forth in claim 1 wherein said jacket extends into said anchoring foot.

9. A spike as set forth in claim 1 wherein said casing includes a transition region adjacent said anchoring foot, and said jacket extending into said transition section and being frustoconically shaped therein.

10. In a motor vehicle tire having a tread surface, a spike mounted in said tire, the improvement being said spike comprising a casing made of a synthetic material, an anchoring foot at the base of said casing, a reinforcing jacket embedded in said casing, a hard metal pin in said jacket, inwardly directed positioning means in said jacket centering said pin in said casing, said casing being positioned in said tire flush with said tread surface, and said pin extending beyond said tread surface.

11. In a motor vehicle tire as set forth in claim 10 wherein apertures are in said jacket, said pin having an enlarged foot, said positioning means including projections disposed above said foot, apertures being in said jacket, said positioning means including further projections directed inwardly toward the portion of said casing remote from said anchoring foot, said casing being in the form of a pair of frustoconical sections joined at their widened ends to provide an inwardly tapered transition section adjacent said anchoring foot, reinforcing ribs further joining said anchoring foot to said transition section, and said jacket having an inwardly inclined portion at said transition section.